United States Patent Office 3,511,894
Patented May 12, 1970

3,511,894
GRAFT POLYMERS AND PREPARATION THEREOF
Gerhard Markert, Ober Ramstadt-Eiche, Germany, assignor to Rohm & Haas G.m.b.H., Darmstadt, Germany
No Drawing. Filed Aug. 30, 1967, Ser. No. 664,273
Claims priority, application Germany, Sept. 10, 1966, R 44,096
Int. Cl. C08f 27/08
U.S. Cl. 260—875
3 Claims

ABSTRACT OF THE DISCLOSURE

A process for the preparation of graft copolymers of an ethylenically unsaturated monomer and a copolymer having free-radical generating azo groups which have been introduced by reaction of an azo compound with an azlactone group of the copolymer.

---

The present invention relates to graft polymers and to methods for making the same. In particular, the present invention relates to graft polymers formed between a grafting monomer and a polymer having free-radical generating azo groups introduced thereinto by reaction of an azo compound with an azlactone group of said polymer.

It is known in the art that macromolecular compounds comprising several monomers can be prepared according to different methods. The most common case is that of copolymerization, by which the components are arranged in the polymer principally in an irregular fashion.

In contrast, block copolymers are characterized by macromolecules having a segment which consists solely of a single monomer to which is joined a second segment consisting essentially of a different monomer. Again, on this latter segment, a further segment consisting essentially of the first monomer is again joined, and so forth.

However, a macromolecule can also comprise a main chain having side chains which are of the same or of a different chemical composition grafted thereon. If the materials composing the main chain and the side chains are different, such graft polymers often exhibit properties of both components and hence differ fundamentally from ordinary copolymers whose properties are either intermediate those of the corresponding homopolymers or even deviate considerably therefrom.

For the preparation of such graft polymers, active sites are first produced on a primary polymer, on which sites the monomer to be grafted thereto is polymerized by combination with the primary polymer. A number of different processes are known for creating such active sites: these can be classified as polymer conversion reactions, as involving radiation or mechanical treatment of the polymers, or as chemical methods.

According to the last-mentioned category, chemical reactions are employed to introduce certain groups into the macromolecule of a polymer. These groups are subsequently activated in the presence of a monomer by formation of a free radical in order to effect polymerization of the monomer. Among the methods employed in the art chemically to introduce active groups into the chain of a primary polymer, the introduction of azo groups into the macromolecule is noteworthy. W. Hahn and A. Fischer have reported on this method in "Die Makromolekulare Chemie," 21, page 77 (1956), where they teach the preparation of polyfunctional macromolecular N-nitroso-N-acetylaryl amines and diazo amino compounds from poly-aminostyryl or from copolymers of p-aminostyryl with ethylmethacrylate. The compounds can be used as initators for the graft polymerization of unsaturated compounds.

Further, German patent publication 1,092,655 disclosed a process in which (1) a primary polymer containing groups capable of forming esters or amides is reacted with (2) an ester or amide forming azo compound capable of forming free radicals on heating, irradiation, or illumination, or with a corresponding hydrazo compound which is easily converted to an azo compound by oxidation. The primary polymer modified in this fashion is then mixed with a polymerizable monomer and the mixture is warmed, whereby free radicals formed on cleavage of nitrogen from the azo compound initiate graft polymerization of the monomer.

According to the last-mentioned method, the azo compound reacts with a primary polymer to form an ester or an amide, that is by condensation. The water produced must be removed by chemical reaction in order to permit the process, e.g. esterification, to go to completion. This is accomplished, for example, by the addition of di-isopropylcarbodiimide, which is converted by the water of reaction into diisopropyl urea. In every case, the isolation of an intermediate product containing the azo group is necessary. This is accomplished in the examples of the German patent by repeated washing with methanol in a kneader at a temperature of about 25° C., with subsequent drying in vacuum. It is clear to one skilled in the art that the washing of a gel or jelly, or of a rubbery product in a kneader is an involved process. The intermediate product isolated in this manner is then mixed with the monomer to be grafted thereto and the mixture is polymerized by heating.

In contrast to the known methods, the preparation of graft polymers according to the present invention can proceed in a single step without the isolation of an intermediate product. This feature is of considerable importance, particularly for the preparation of solution polymers and of dispersions.

It must be considered surprising that azo compounds could be smoothly introduced into an appropriate macromolecular compound by addition, whereby the later formation of free radicals by cleavage of nitrogen and the initiation of polymerization of a monomer is permitted, with formation of a graft copolymer.

It has been found according to the present invention that macromolecular compounds containing an azlactone group

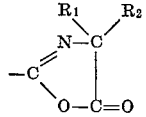

wherein $R_1$ and $R_2$ taken alone each signify alkyl, cycloalkyl, aryl, or aralkyl, or taken together with the carbon atom to which they are joined signify a carbocyclic or heterocyclic ring, smoothly and even at ordinary temperatures add azo compounds having azlactone-reactive groups thereon, such as hydroxy, amino, mercapto, or hydrazido groups. On warming, the addition compound produces free radicals with the liberation of nitrogen, which radicals initiate the polymerization of a monomer added thereto. The number of the free radical-forming groups present to effect graft polymerization of a monomer can be predetermined with good accuracy by choosing the number of azlactone groups incorporated into the primary polymer. In general, the azlactone monomer is from 0.1 to 25 percent by weight of the primary polymer.

The formal course of the first stage of the process according to the invention is exemplified below by the reaction of a copolymer formed between a polymerizably unsaturated compound and an azlactone, specifically 2-isopropenyl-4,4-dimethyloxazolone-5, with an azo compound, specifically azo bis(isobutyric acid hydrazide):

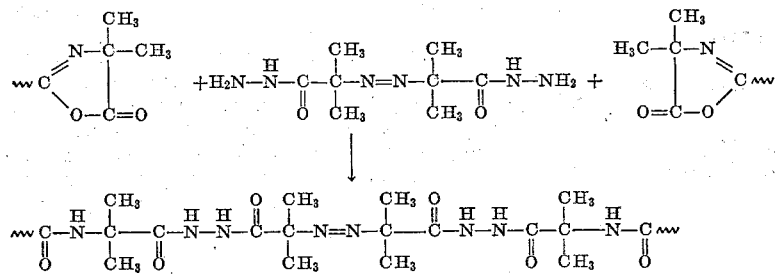

When a polymer containing an azlactone group is reacted with an azo compound containing two amino or hydroxy groups, cross-linking takes place, as is evident from the formula above. Because of this, a gel-like intermediate product is obtained. In order to avoid the expense involved in thoroughly mixing a product of this type with a monomer, it is suitable to mix the monomer to be grafted with the starting polymer before the cross-linking. In certain cases, the primary polymer can suitably be swelled with the monomer.

The use of azo compounds having two reactive groups is advantageous when the highest possible degree of cross-linking is sought. In other cases, an azo compound having only one reactive group can be suitably combined with the azlactone groups, for example an azo bis(isobutyric acid) monohydrazide-monomethylester of the formula

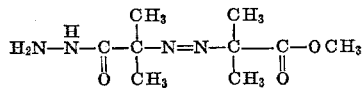

It should be pointed out that notoriously stable ester and amido compounds are formed by addition of the hydroxy- or amino-azo compounds to macromolecular compounds containing azlactone groups according to the addition reaction of the present invention.

The further course of the method according to the invention clarifies the fundamental difference between the reaction of a polymer containing azlactone groups with, on the one hand, an azo compound having two reactive groups and, on the other hand, with an azo compound having only one reactive group. On heating a mixture of an addition product containing an azo group with a polymerizable monomer, cleavage of the former compound results with liberation of nitrogen. In those cases in which azo compounds having two reactive groups have been combined with two macromolecules containing azlactone groups, i.e. with cross-linking as is shown in the formulas earlier above, two macromolecules having free radicals in side chains thereof are produced. The polymerization of the monomer, with the formation of a graft copolymer, begins at these sites. However, if a compound of the type such as azo bis(isobutyric acid) monohydrazide-monomethyl ester, which contains only one azlactone reactive group is added to a polymer containing an azlactone group, and a mixture of the resultant addition compound is then heated with a polymerizable monomer, cleavage of the macromolecular azo addition compound results in the formation of a macromolecular and a low molecular weight free radical. Both effect polymerization —the first with formation of a graft copolymer and the second with the production of a nongrafted polymer, so that in this case the product obtained is a mixture of a graft copolymer and a homopolymer or copolymer.

Macromolecular compounds containing azlactone groups can be simply prepared by the copolymerization of olefinically unsaturated monomers, preferably vinyl or vinylidene compounds, with azlactones of the general formula

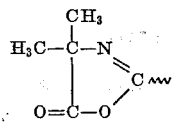

in which $R_1$ and $R_2$ have their earlier significance and $R_3$ is a group containing a polymerizable carbon-carbon double bond.

Suitable monomers include acrylic and methacrylic acids, the esters, nitriles, and amides of these acids, styrene, vinyl esters, and olefins.

Azlactones or oxazalones can be viewed as the anhydrides of α-acylaminocarboxylic acids, and can be prepared from these amino acids by dehydration, for example using acetic anhydride ["Organic Reactions," vol. III, page 198 (1949)]. The following formula exemplifies the preparation of a polymerizable azlactone by the reaction of α-aminoisobutyric acid with methacrylic acid chloride.

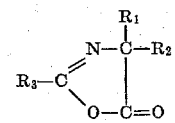

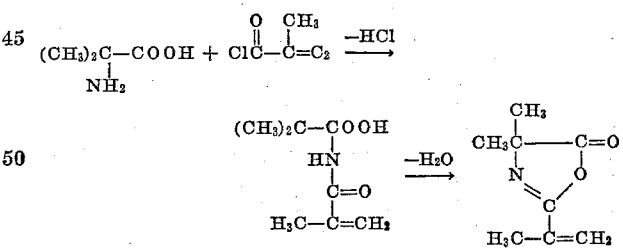

As examples of azlactones which can be copolymerized with the monomers already mentioned, or with other monomers, to produce a starting polymer, 2-isopropenyl-4,4-dimethyl oxazalone; 2-isopropenyl-4-methyl-4-propyl-oxazalone; 2-isopropenyl-4,4-dipropyl-oxazalone; 2-vinyl-4-methyl-4-benzyl-oxazalone; 2-acrylyloxethyl-4-methyl-4-cyclohexyl-oxazalone; 2-vinyl-4-methyl-4-phenyl-oxazalone; 2-(2'-N-methacrylamido-isopropyl)4,4-dimethyl-oxazolone; cyclohexane-spiro-4-(2-isopropenyl-oxazolone); and tetrahydropyran-4-spiro-4'-(2'-vinyl-oxazolone) can be mentioned. These azlactones are suitably copolymerized at a temperature of from 0° C to 200° C. in the presence of catalytic quantities of free-radical polymerization agents known to the art.

The structure of the azo compounds to be added to the azlactone groups according to the present invention is not critical providing the compounds (1) have at least one azlactone reactive group and (2) decompose on heating to cleave nitrogen with the formation of free radicals. The azo compounds are often derivatives of azo-dicarboxylic acids, but are not limited to such derivatives and include azo compounds of diverse structure. As azlactone reactive groups, primary or secondary amino groups, hydroxy groups, mercapto groups and hydrazido groups can be mentioned. The following materials may be mentioned as exemplary: azo bis(isobutyric acid amino ethyl ester), azo bis(isobutyric acid-hydrazide), azo bis-α(α-nitrilovalerianic acid hydrazide), and azo bis(1-nitrilo-4-hydroxycyclohexane. These compounds all have two reactive groups in their molecules, i.e. they add with simultaneous cross-linking. In contrast, compounds such as azo bis(isobutyric acid) monohydrazide-monomethyl ester or azo bis(isobutyric acid) monhydrazide-nitrile have only one azlactone reactive group, i.e. the amino portion of the hydrazido group, so that addition of these azo compounds to a polymer containing azlactone groups proceeds without cross-linking.

In principle, all monomers polymerizing by a free radical mechanism can be used according to the present invention as grafting monomers, including monomers like those comprised within the primary or backbone polymer. In addition to those monomers already mentioned as examples of monomers copolymerizable with azlactones and which can also be used as the grafting component, the class of polymerizable heterocycles, including such compounds as N-vinyl pyrrolidone, N-vinyl imidazole, and N-vinyl oxazolidone, can be mentioned as especially useful as the grafting component.

It should also be mentioned that in place of azo compounds having one or two azlactone reactive groups in the molecule, peroxides having —OH or —NH$_2$ groups can be combined with copolymers containing azlactone groups. However, the known instability of peroxides makes them technically unsuitable for ready use in the present invention.

It is common to all of the embodiments according to the present invention that the addition of an azo compound to an azlactone copolymer takes place at temperatures of from about 20° C–70° C. and that the subsequent free-radical formation with cleavage of nitrogen, and thereby the polymerization of the monomer to be grafted, occurs only at higher temperatures of about 90° C.–150° C. Since the difference between these two temperature regions can be from 70 to 130 centigrade degrees, both steps of the process, namely addition and polymerization, can be easily controlled.

Graft polymers prepared according to the present invention are useful for forming impact-resistant bodies, as raw materials for lacquers, and as emulsifying and dispersing agents. Further, they are effective lubricating oil additives, textile auxiliaries, and flocculating agents.

A better understanding of the present invention and of its many advantages will be had by referring to the following specific examples, given by way of illustration. All parts are by weight.

EXAMPLE 1

49 parts ethyl acrylate and two parts of 2-isopropenyl-4,4-dimethyl oxazalone were polymerized in 50 parts by weight of ethyl glycol acetate in the presence of 1 part by weight of azoisobutyric acid diethyl ester at 80° C. After five hours, the mixture was cooled to 40° C. and a mixture of 49 parts of styrene, 1.5 parts of azo bis(isobutyric acid dihydrazide), 45 parts of ethyl glycol acetate, and 5 parts of glacial acetic acid was added. The temperature was held at 40° C. until a uniform gel resulted, then the mixture was heated for 5 to 7 hours at 100°–120° C. The gel again became liquid and was converted into a viscous, slightly cloudy, stable solution.

Extraction experiments showed that 70–80 percent of the end product was insoluble in solvents (methanol or cyclohexane) selective for the homopolymer, i.e. that the monomer was grafted. The graft yield for the styrene employed was 90 percent.

EXAMPLE 2

Thirty parts of butyl acrylate, ten parts of methyl methacrylate, and two parts of 2-vinyl-4-methyl-4-propyloxazalone were polymerized in 45 parts of ethyl glycol acetate in the presence of 0.5 part of azoisobutyric acid dinitrile. After five hours, the mixture was cooled to 40° C. and a mixture of 2.8 parts of azo bis(isobutyric acid) monohydrazide-monomethylester and of 10 parts of ethyl glycol acetate was added. After warming for five hours at 40° C., 40 parts by weight of methyl methacrylate and 20 parts of ethyl acrylate in 45 parts of ethyl glycol acetate were added and the mixture was polymerized at 100°–120° C. over a period of five to seven hours.

EXAMPLE 3

12 parts of methyl methacrylate, 34 parts of 2-ethylhexyl acrylate, and 2 parts of 2-isopropenyl-4,4-dimethyl-oxazolone were polymerized at 90° C. over five hours in 50 parts of butyl acetate in the presence of 1.5 parts of lauroyl peroxide. The mixture was then cooled to 50° C. and combined with a mixture of 30 parts of methyl methacrylate, 10 parts of acrylonitrile, 2 parts of azo bis(1-nitrilo-4-hydroxycyclohexane), 30 parts of toluene, and 5 parts of trichloroacetic acid. The temperature was kept at 50° C. for 5 hours, and then at 100° C.–140° C. for 5–7 hours to effect polymerization.

EXAMPLE 4

42 parts of ethyl acrylate, 8 parts of styrene, and 3 parts of 2 - (2'-methacrylamido-isopropyl)-4,4-dimethyl-oxazolone were polymerized in 30 parts of toluene and 20 parts of butyl acetate at 80° C. in the presence of 1.2 parts of azo bis(isobutyronitrile). After 5 hours the mixture was cooled to 30° C. and combined with a mixture of 33 parts of styrene, 15 parts of methacrylic acid, and 2 parts of azo bis α(α-nitrilo-valerianic acid hydrazide). The mixture was heated at 30° C. for 7 hours, then polymerized at 90°–130° C. for 5–7 hours.

What is claimed is:

1. In a proces for the preparation of a graft polymer by introducing thermally decomposable azo groups into a primary polymer by reacting an azo compound therewith, and then heating the resulting heat-sensitive compound with at least one ethylenically unsaturated monomer to be graft polymerized thereon until nitrogen is cleaved from the polymer and the monomer polymerizes at the free-radical sites so formed, the improvement wherein said primary polymer is a copolymer containing azlactone groups of the formula

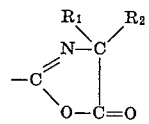

wherein $R_1$ and $R_2$ taken alone each represent alkyl, cycloalkyl, aryl, or aralkyl, and taken together with the carbon atom to which they are attached form a carbocyclic or heterocyclic ring, and said azo compound has at least one azlactone reactive group therein.

2. The process as in claim 1 wherein said primary polymer and azo compound react at a temperature of from 20° C. to 70° C. by addition without formation of water, and said cleavage of nitrogen and polymerization take place on heating the result heat-sensitive compound to a temperature from 90° C. to 150° C.

3. The process as in claim 1 wherein said heat-sensitive compound containing thermally decomposable azo groups is formed from said primary polymer and said azo compound in the presence of said ethylenically unsaturated monomer.

References Cited

UNITED STATES PATENTS 3,083,118  3/1963  Bridgeford.

FOREIGN PATENTS 1,092,655  11/1960  Germany.
818,412  8/1959  Great Britain.

SAMUEL H. BLECH, Primary Examiner

H. ROBERTS, Assistant Examiner

U.S. Cl. X.R.

260—29.6, 78, 80.72, 86.1, 307, 877, 881, 885